US007056121B2

(12) United States Patent
Koeppel

(10) Patent No.: US 7,056,121 B2
(45) Date of Patent: Jun. 6, 2006

(54) KIT FOR DECORATING A HOLOGRAPHIC IMAGE BEARING PANEL

(75) Inventor: Ronald Koeppel, Brookville, NY (US)

(73) Assignee: Continental Accessory Corporation, Amityville, NY (US)

( * ) Notice: Subject to any disclaimer, the term of this patent is extended or adjusted under 35 U.S.C. 154(b) by 472 days.

(21) Appl. No.: 10/653,635

(22) Filed: Sep. 2, 2003

(65) Prior Publication Data

US 2005/0045524 A1 Mar. 3, 2005

(51) Int. Cl.
*G09B 11/10* (2006.01)

(52) U.S. Cl. ..................................... 434/84
(58) Field of Classification Search ............. 434/81, 434/84, 85, 98; 283/63.1
See application file for complete search history.

(56) References Cited

U.S. PATENT DOCUMENTS

| | | | | |
|---|---|---|---|---|
| 3,747,232 A | * | 7/1973 | Donaldson et al. | 434/84 |
| 4,073,070 A | * | 2/1978 | Boston | 434/84 |
| 4,212,393 A | * | 7/1980 | Lenkoff | 206/575 |
| 4,620,770 A | * | 11/1986 | Wexler | 359/464 |
| 4,996,087 A | * | 2/1991 | Rebstock | 428/11 |
| 5,106,305 A | * | 4/1992 | Grant | 434/84 |
| 5,215,956 A | * | 6/1993 | Kawashima | 503/201 |
| 5,788,286 A | | 8/1998 | Hunt | |
| 5,788,501 A | * | 8/1998 | Hassall | 434/84 |
| 5,897,322 A | * | 4/1999 | Shteyngarts | 434/84 |
| 6,786,728 B1 | * | 9/2004 | Leblanc et al. | 434/84 |

* cited by examiner

*Primary Examiner*—Kurt Fernstrom
(74) *Attorney, Agent, or Firm*—Caesar, Rivise, Bernstein, Cohen & Pokotilow, Ltd.

(57) ABSTRACT

A kit for decorating a panel bearing holographic areas. The kit includes the panel and plural marker pens. Each of the marker pens is arranged to provide a respective colored ink. The panel includes a decorative area made up of plural blank areas and plural hologram areas which together form a decorative image. Each of the hologram areas is resistant to the absorption of the ink thereon, whereupon ink from the pens can be applied to the blank areas to produce a neatly colored decorative image.

20 Claims, 2 Drawing Sheets

KIT FOR DECORATING A HOLOGRAPHIC IMAGE BEARING PANEL

BACKGROUND OF THE INVENTION

This invention relates generally to decorating kits and more particularly to a kit for decorating a panel bearing a holographic image.

In United States Statutory Invention Registration H467 (Gladden) there is disclosed a kit for assembling art material in a art album. Among the components of the kit are drawings, holograms, colored magic markers, color paints and colored pens.

Kits for coloring posters using magic markers are commercially available. Such kits include a panel, e.g., a poster or sheet, that includes areas that are flocked with a coating material located adjacent blank areas. The blank areas are arranged to be colored by the application of the ink from the magic markers. The flocked areas are typically black in color and are resistant to the ink from the magic marker or else prevent the ink from being seen on them. Accordingly, children can color the panel by applying ink to the blank areas to make a poster or some other artwork, so that the finished work appears neatly done, e.g., no ink extending beyond the areas that are supposed to be colored.

U.S. Pat. No. 5,788,286 discloses a children's book that is enhanced with hologram features.

While all of the aforementioned prior art may be suitable for their general purposes they still leave much to be desired from one or more of various standpoints, such as entertainment value to children, ease and effectiveness of use, and aesthetic appearance of the completed work.

SUMMARY OF THE INVENTION

In accordance with one aspect of this invention there is provided a kit and a for decorating a panel (e.g., a poster). The kit and its method of use is particularly suitable for children or other persons who may not have sufficient manual dexterity to apply colors to a panel within specifically defined confined areas on the panel.

The kit comprising a decoratable panel and at least one coloring device (e.g., plural respectively colored marker pens). The panel comprises a surface arranged to be decorated. The surface is made up of plural blank areas and plural hologram areas adjacent the blank areas. The adjacent plural hologram areas define confined boundaries of respective predetermined shapes for each of the blank areas. The plural blank areas and the plural hologram areas cooperate with one another to form a decorative image.

The at least one coloring device (e.g., marking pen) is arranged to color (e.g., provide colored ink to) selected portions of the surface of the panel (e.g., poster). The hologram areas of the panel are resistant to being colored (e.g., are resistant to receipt of colored ink), whereupon a user (e.g., a child) can color (e.g., apply the colored ink to) at least a selected one of the plural blank areas within the confined boundary of that areas, but not to the adjacent hologram areas, thereby resulting in a neatly appearing decorated colored image on the panel.

The method entails providing a kit, like set forth above, so that a user (e.g., a child or other person not having sufficient manual dexterity to apply colors to a panel within specifically defined confined areas on the panel) can grasp the at least one coloring device in his/her hand and bring it into contact with the decoratable panel to color at least selected ones of the plural blank areas of the panel. Since the hologram areas are resistant to being colored, the user can color each plural blank area within its confined boundaries, but not color the adjacent hologram areas, thereby resulting in a neatly appearing decorated colored panel.

DETAILED DESCRIPTION OF THE PREFERRED EMBODIMENT

Figure 1:
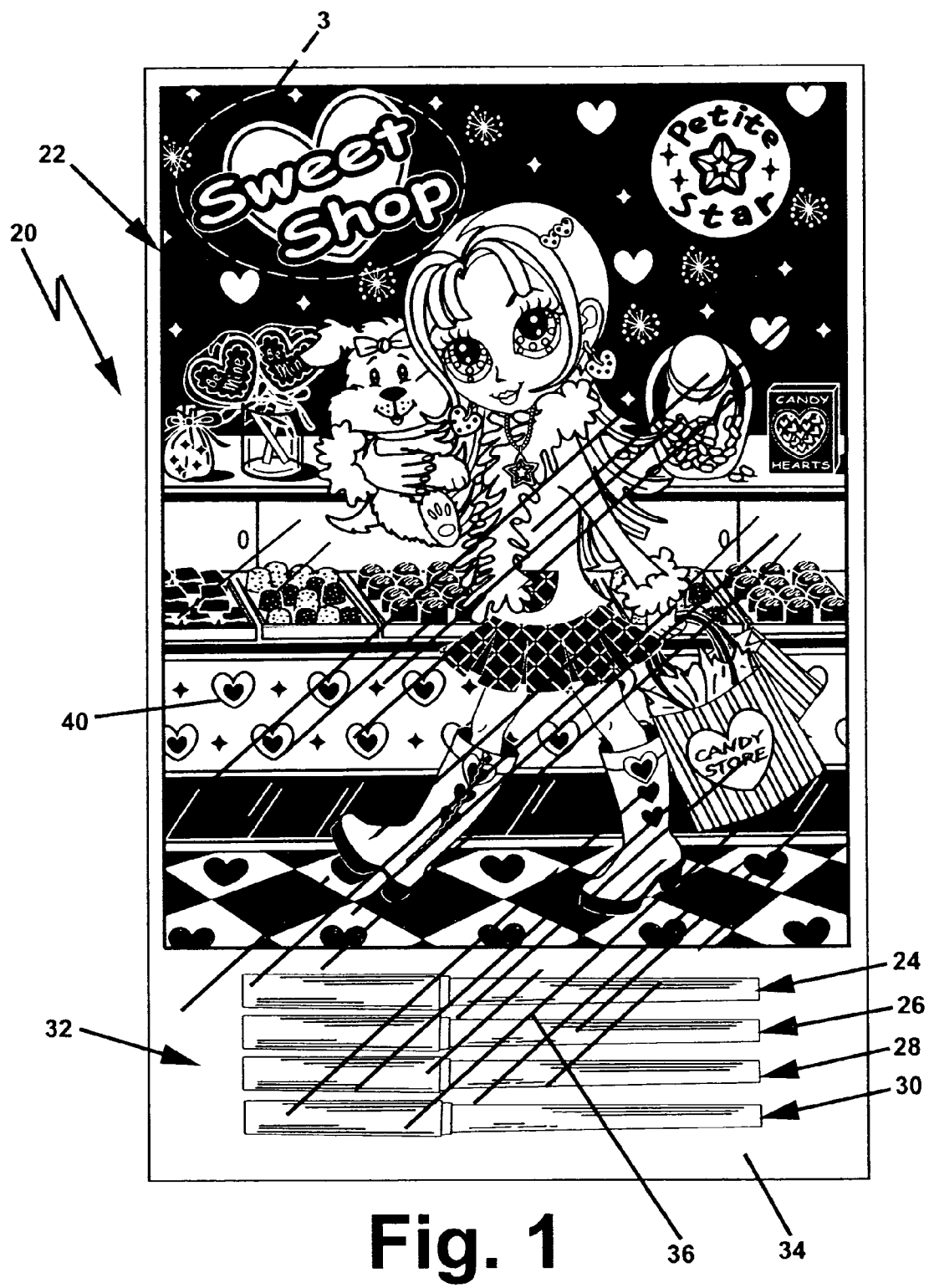
FIG. 1 is a top plan view of the kit of the subject invention including its plural coloring devices, e.g., marking pens, and decoratable panel, e.g., a poster.

Referring now to the various figures of the drawing wherein like reference characters refer to like parts, there is shown at 20 in FIG. 1 one exemplary embodiment of a kit of the subject invention. The kit basically comprises a decoratable panel 22 and plural coloring devices 24, 26, 28 and 30 located within a package 32. The details of the decoratable panel 22 and the coloring devices 24–30 will be described shortly. Suffice for now to state that the panel 22 is a flat member, e.g., a poster, of a predetermined shape, e.g., rectangular, and having a front surface bearing an image that is arranged to be colored by the plural coloring devices 24–30. The plural marking devices 24–30 of the exemplary embodiment comprises plural conventional marking pens, each arranged to provide a respectively colored ink.

The package 32 can be of any suitable construction. In the exemplary embodiment shown, the package 32 comprises a backer panel 34 and a cover sheet 36. The backer panel 34 is formed of any suitable relatively rigid material, e.g., cardboard, plastic, etc., and is arranged to hold the poster 22 and the marking pens 24–30 thereon. To that end the backer panel is larger than the poster to provide an area for the poster and an area for the marking pens on it, as best seen in FIG. 1. The cover sheet 36 may be of any suitable construction, e.g., it may be a clear plastic shrink wrap material or any other flexible material which is at least partially transparent to see the poster and, if desired, the marking pens therethrough. If desired, the cover can be a thermoformed plastic so as to be relatively rigid and to form a pocket or cavity for holding the marking pens. In any case the cover sheet 36 is secured to the backer panel so that the poster 22 and the marking pens 24–30 are held between it and the backer panel.

It should be pointed out at this juncture that while the foregoing description of the kit has focused on a poster as being the decoratable panel, the subject invention is not so limited. Thus, the subject invention contemplates any generally planar member, e.g., a greeting card, etc., having a decoratable surface that is arranged to be colored. As mentioned above, the exemplary embodiment of the kit 20 of FIG. 1 makes use of plural marking pens as the color. The type of coloring devices used in the kit, is not limited to only marking pens. Thus, the coloring devices can comprise colored crayons, colored chalk, colored paint markers, etc. so long as each is capable of applying a coloring agent to portions of the surface of the panel to be decorated, but not to other portions, e.g., hologram portions (to be described later).

In the exemplary embodiment 20, where the coloring devices are conventional ink-marking pens the decoratable panel, e.g., poster 22, can be formed of any suitable material, e.g., paper-stock, that can accept a coloring agent, e.g., the ink from the marking pens. The front surface of the poster 22 includes a holographic image 40 in the form of a layer of plastic printed on portion of the surface of the poster by any suitable conventional process to represent any desired design, e.g., a cartoon-like image. As will be appreciated by those skilled in the art the image 40, being in the form a plastic material hologram, is resistant to the absorption of ink. Thus, any ink attempted to be applied to the holographic image by the marking pens 24-30 will not stick. The holographic image 40 can also be made so that it is resistant to receipt of crayon and/or chalk and/or paint thereon, so that different types of coloring devices than the marking pens 24-30 can be used to color the poster 22.

Figure 3:
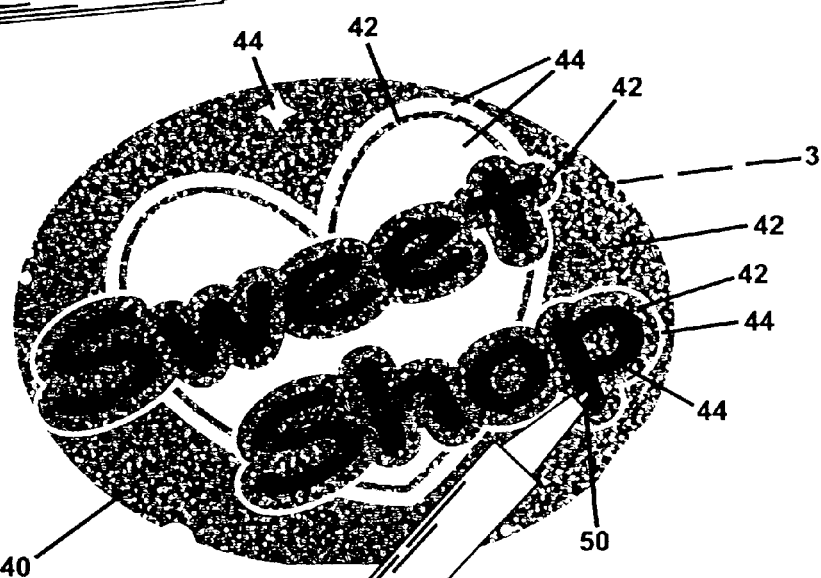
FIG. 3 is an enlarged view a portion of the poster shown within the oval boundary designated by the reference number "3" in Fig. in the process of being colored by one of the marking pens of the kit.
Figure 3:
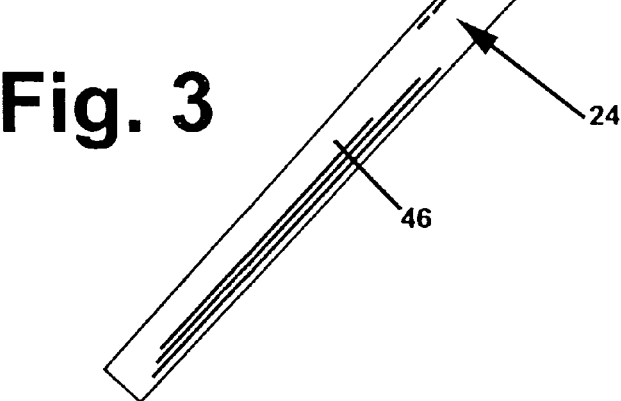

In the exemplary embodiment shown the holographic image 40 basically comprises a cartoon-like design of young child "dressed-up" in a party frock, holding a pet in one arm and a shopping bag in the other as she is walking through a candy shop. This image 40 is exemplary of a myriad of designs that can be applied to the surface of the panel 22. As best seen in FIG. 3, the image 40 is made up of numerous respective hologram areas 42 and numerous blank areas 44 bounded by adjacent hologram areas 42. Each blank area 44 is white in color (e.g., the color of the material making up the poster 22) and is of a defined shape, i.e., it is located within a confined boundary. The confined boundary is established by the marginal edges of the contiguous hologram areas 42. For example, as shown in FIG. 3 the portion of the image 40 shown within the bounds of the oval designated by the reference number 3 in FIG. 1 includes respective hologram areas 42 bounding the blank areas 44 making up the letters spelling out the two words "Sweet" and "Shop." There is also a hologram area 44 in the shape of a heart intersecting some of the letters of the words "Sweet Shop" and a large hologram area surrounding the heart and the words "Sweet Shop." These are but a few of the various hologram areas 42 and blank areas 44 making up the total image 40.

As best seen in FIG. 3 the image produced by all of the hologram portions 42 of the decorative image 40 is the same design. In the exemplary embodiment that image is prismatic and speckled, i.e., has plural multicolored dots or specks, with the color of the dots or specks changing as the angle of view changes. In the interests of drawing simplicity the hologram portions 42 making up the image 40 shown in FIG. 1 are in solid black, whereas in the enlarged view of FIG. 3, they can be seen as being of a prismatic-speckled design. Thus, the holographic image 40 of the poster will seem to sparkle or twinkle as the viewer move his or her head with respect to the poster (or moves the poster with respect to his/her head). It should be noted that other hologram designs for may be used for the image 40, in lieu of the speckled hologram design shown, e.g., concentric circles, parallel lines, sunburst designs, etc. Moreover, if desired different ones of the hologram portions 42 may have different designs, e.g., some of the portions 42 may be speckled, with other portions 42 being of a sunburst design, etc.

Figure 2:
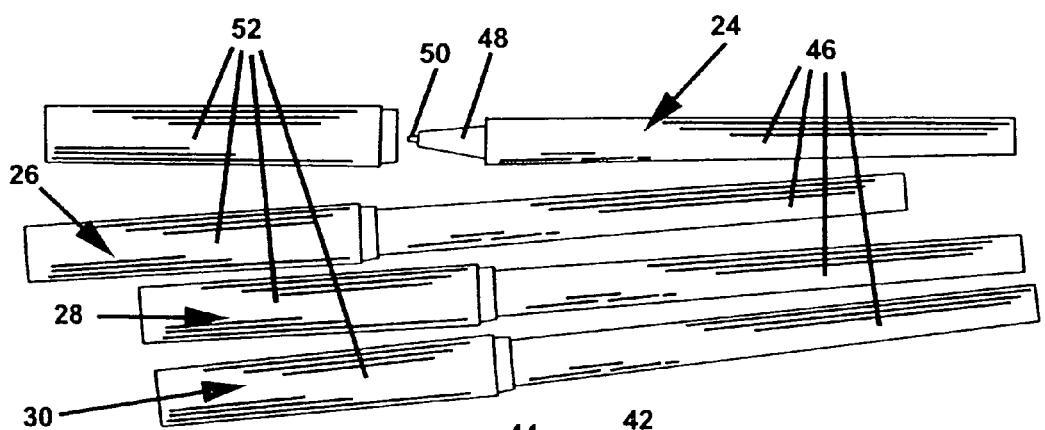
FIG. 2 is an enlarged top plan view showing the plural marking pens of the kit of the subject invention.

As mentioned above the marking devices 24–30 constitute conventional marking pens. Such pens are best seen in FIG. 2. Each of the pens is of identical construction, except for the color of its housing and the color of the ink that it is arranged to apply. Thus, in the interest of brevity, the details of only one of the marking pens, i.e., pen 24, will be described. That pen basically comprises a hollow cylindrical body 46 having an interior reservoir (not shown) in which a flowable ink, e.g., red ink, is disposed. The free or working end 48 of the body 46 is in the form of a porous tip 50. A portion of the tip 50 extends into the reservoir to wick the ink therefrom. The free end of the tip is arranged to apply the ink to selected blank area 44 of the poster. A cylindrical cap 52 is releasably secured to the body to cover the tip 50 to prevent it from drying out and to prevent accidental application of the ink from the marking pen. The pens 24–30 contain pink, purple, and blue ink, respectively, therein. Obviously, the color of the ink in each of the pens is a matter of choice and the type of image 40 to be colored. Moreover, the number of pens in the kit is also a matter of choice and the type of image to be colored.

Use of the kit is as follows, the user, e.g., child, removes the poster 22 and the marking pens 24–30 from the package. The poster is then placed on any suitable work surface. The backer panel 34 can be used for this purpose, if desired. The user than takes a selected one of the plural marking pens 24–30 and removes its cap 52 to expose the marking tip 50. The selected pen is then used to color any desired blank (e.g., white) area 44 of the image 40. In FIG. 3 the pen 24 is shown as having colored the letters of the words "Sweet Shop." Since the hologram areas contiguous with the selected blank area to be colored are resistant to the ink, if the user in coloring the blank area should go beyond the boundary of that area onto a contiguous hologram area, the contiguous hologram area will not accept the ink. Thus, the user can fully color the blank area 44 within the confines of its boundary, irrespective of the user's level of skill or manual dexterity. The other blank areas can be colored in a similar manner.

As will be appreciated by those skilled in the art, a user of the kit can have a lot of fun coloring a poster with the marking pens, watching the image change from a hologram and white to the user's multicolored creation. Moreover, the resulting poster will be neat and look professionally done since the colored areas will be confined to only those areas that should be colored.

Without further elaboration the foregoing will so fully illustrate my invention that others may, by applying current or future knowledge, adopt the same for use under various conditions of service.

I claim:

1. A kit for decorating a panel, said kit comprising a decoratable panel and at least one coloring device, said decoratable panel comprising a surface arranged to be colored, said surface comprising plural blank areas and plural hologram areas adjacent said blank areas, said adjacent plural hologram areas defining confined boundaries of respective predetermined shapes for each of said blank areas, said plural blank areas and said plural hologram areas cooperating to form a decorative image, said at least one coloring device being arranged to color at least a selected one of said plural blank areas of said surface, said hologram areas of said surface being resistant to being colored by said coloring device, whereupon a user can color at least selected ones of said plural blank areas within said confined boundaries, but not said adjacent hologram areas, thereby resulting in a neatly appearing decorated colored image on said panel.

2. The kit of claim 1 wherein said at least one coloring device is arranged to provide a flowable coloring agent to said surface area and wherein said hologram areas are resistant to receipt of said coloring agent thereon.

3. The kit of claim 2 wherein said at least one coloring device comprises a marking pen for dispensing colored ink.

4. The kit of claim 1 comprising plural coloring devices.

5. The kit of claim 3 comprising plural coloring marking pens.

6. The kit of claim 1 wherein each of said hologram areas bears the same holographic image.

7. The kit of claim 6 wherein said holographic image is speckled.

8. The kit of claim 2 wherein each of said hologram areas bears the same holographic image.

9. The kit of claim 8 wherein said holographic image is speckled.

10. The kit of claim 1 wherein said panel comprises a poster.

11. The kit of claim 3 wherein said panel comprises a poster.

12. The kit of claim 11 wherein each of said hologram areas bears the same holographic image.

13. The kit of claim 1 wherein said kit is disposed within a package.

14. The kit of claim 11 wherein said kit is disposed within a package.

15. The kit of claim 14 wherein said package comprises a transparent cover and a rigid backer panel, said poster and said marking pens being disposed on said backer panel, said cover being located over said marking pens and said poster and being secured to said backer panel.

16. A method for producing a neatly decorated color panel by a user, said method comprising:
(A) providing a kit including a decoratable panel and at least one coloring device, said decoratable panel comprising a surface arranged to be colored, said surface area comprising plural blank areas and plural hologram areas adjacent said blank areas, said adjacent plural hologram areas defining confined boundaries of respective predetermined shapes for each of said blank areas, said plural blank areas and said plural hologram areas cooperating to form a decorative image, said at least one coloring device being arranged to color said surface, said hologram areas being resistant to being colored; and
(B) grasping said at least one coloring device in a hand of the user and bringing said device into contact with said decoratable panel to color at least a selected one of said plural blank areas within the confined boundaries thereof, but not said adjacent hologram areas, thereby resulting in a neatly appearing decorated colored panel.

17. The method of claim 16 wherein said at least one coloring device is arranged provide a flowable coloring agent to said decoratable panel, said hologram areas being resistant to receipt of said coloring agent thereon.

18. The method of claim 17 wherein said kit comprises plural marking pens, each of said marking pens being arranged to provide a different flowable coloring agent, and wherein said panel comprises a poster to be colored by said plural marking pens.

19. The method of claim 18 wherein each of said hologram areas bears the same holographic image.

20. The method of claim 19 wherein said holographic image is speckled.

* * * * *